Figure 1:
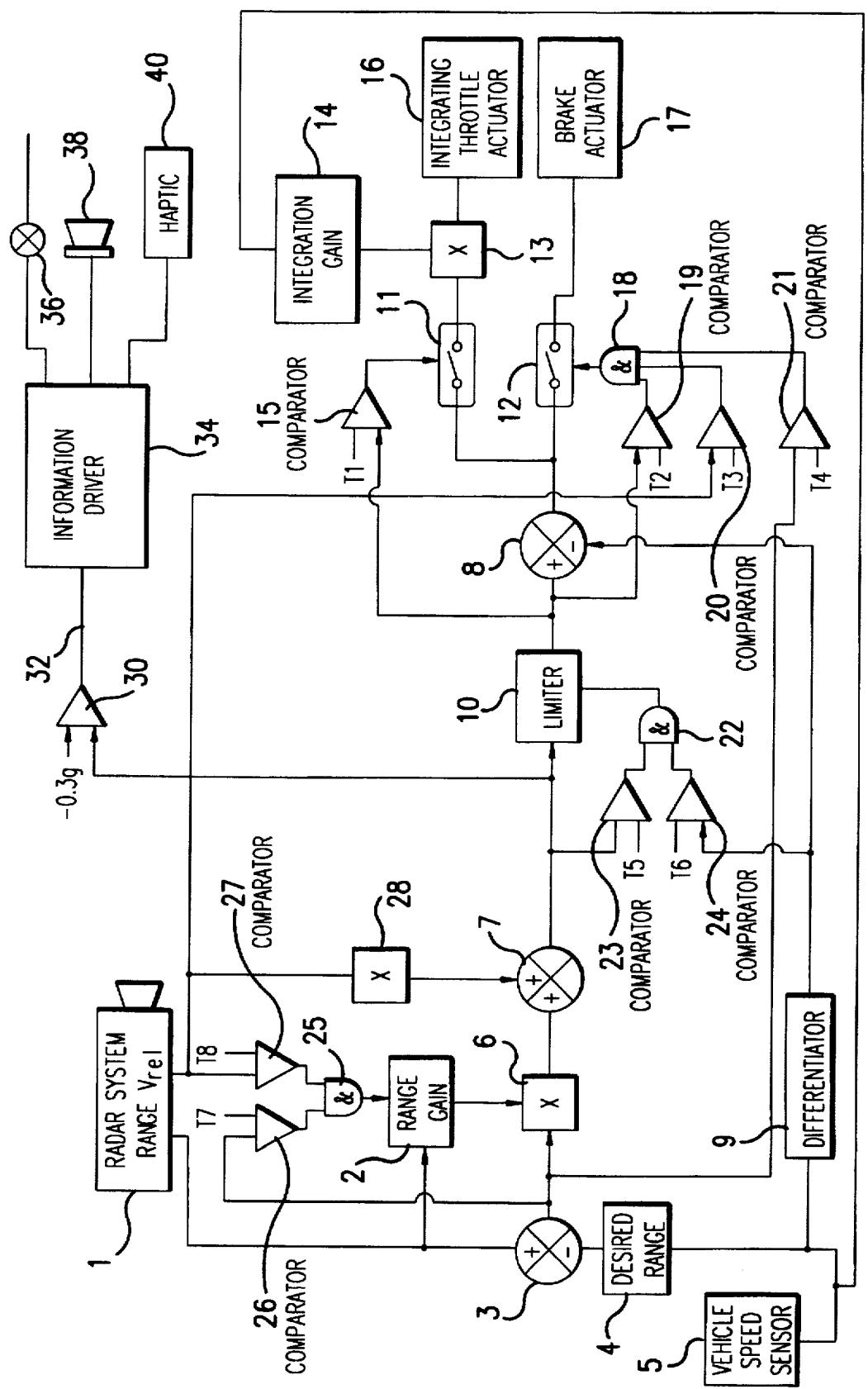

United States Patent [19]

Gilling

[11] Patent Number: 5,781,103
[45] Date of Patent: Jul. 14, 1998

[54] APPARATUS AND METHOD FOR CRUISE CONTROL

[75] Inventor: Simon Peter Gilling. Milton Keynes, England

[73] Assignee: Lucas Industries Public Limited Company. Solihull, England

[21] Appl. No.: 563,121

[22] Filed: Nov. 29, 1995

[30] Foreign Application Priority Data

Dec. 1, 1994 [GB] United Kingdom .................. 9424266

[51] Int. Cl.⁶ ........................................ B60Q 1/00
[52] U.S. Cl. .................. 340/441; 340/438; 340/463; 340/439; 180/169; 364/426.044
[58] Field of Search ................................ 340/463, 464, 340/467, 468, 438, 439, 903, 441; 364/426.044; 180/167, 170

[56] References Cited

U.S. PATENT DOCUMENTS

| | | |
|---|---|---|
| 4,143,352 | 3/1979 | Jarmotz .......................... 340/441 |
| 5,173,859 | 12/1992 | Deering ....................... 364/424.01 |
| 5,234,071 | 8/1993 | Kajiwara ......................... 180/169 |
| 5,455,558 | 10/1995 | Gregory ........................... 340/474 |
| 5,493,302 | 2/1996 | Woll et al. ......................... 342/71 |
| 5,495,251 | 2/1996 | Gilling et al. ..................... 180/167 |
| 5,529,139 | 6/1996 | Kurahashi et al. ................ 340/903 |

*Primary Examiner*—Donnie L. Crosland
*Attorney, Agent, or Firm*—Oblon, Spivak, McClelland, Maier & Neustadt, P.C.

[57] ABSTRACT

A cruise control system for a road vehicle having apparatus which, when cruise control is engaged, is arranged to inform the driver of the vehicle when a maximum braking force allowed by the cruise control system is being applied, so that the driver can make a decision as to whether or not to take over control of the vehicle from the cruise control system.

2 Claims, 2 Drawing Sheets

APPARATUS AND METHOD FOR CRUISE CONTROL

The present invention relates to an apparatus and method for cruise control of vehicles.

It is well known to provide cruise control facilities in a vehicle which allow the driver to set a target vehicle speed, the vehicle road speed being adjusted automatically by the cruise controller so as to maintain the actual vehicle speed at the target speed for as long as the cruise control is activated. Such known controllers do not monitor the distance to or speed of vehicles which lie ahead of the controlled vehicle, so that the driver must intervene if the vehicle under cruise control approaches too closely to a vehicle ahead of it, for example to ensure that a "safe" braking distance remains between the vehicles, based on such factors as the driver's perception of the road conditions, weather conditions and vehicle performance. The driver intervention can involve adjusting the set target speed to a new target or at least temporarily switching off the cruise control altogether, for example by applying the vehicle foot brake or displacing a cruise control operating lever to an off position. In the case that a vehicle ahead increases its speed, the driver of the vehicle under cruise control also has the facility to manually adjust the target speed upwardly to a new target by actuation of the cruise control operating lever.

A recent development in cruise control has involved reducing the necessity for driver involvement by enabling the cruise control system to be aware of and react to the presence and performance of a vehicle, referred to hereinafter as a target vehicle, running ahead of the vehicle under cruise control. A system of this type is disclosed in our EP-A-0 612 641 to which reference is hereby directed, wherein the cruise control apparatus comprises distance error determining means for determining a distance error as the difference between a desired distance between a target vehicle and the controlled vehicle and the actual distance between the target vehicle and the controlled vehicle, speed error determining means for determining a speed error as the difference between the speed of the target vehicle and the speed of the controlled vehicle, and acceleration demand producing means for producing a vehicle acceleration demand as a function of the distance error and of the speed error.

The acceleration demand can be calculated as the sum of the product of the distance error and a first gain parameter and the product of the speed error and a second gain parameter. The second gain parameter may be a constant, such as unity.

The distance and speed errors can be determined in a number of ways for example using an electro-magnetic or ultra-sonic radar system for providing a direct measure of distance to a target vehicle ahead. The speed error can be obtained by differentiating the output of the radar system with respect to time. In other systems, the speed error may be formed automatically by the radar system for example if the radar system is of the doppler type.

A preferred embodiment of the known system of EPA-0 612 641 also includes desired distance determining means for determining the desired distance as a function, for example a linear function, of the vehicle speed. It also preferably includes an acceleration error producing means for providing an acceleration error as the difference between the calculated acceleration demand and the actual vehicle acceleration.

The apparatus of EP-A-0 612 641 also includes a gating means for supplying the acceleration error to a vehicle drive system when the acceleration demand is greater than a first threshold ($\geq 0$), and for supplying the acceleration error to the vehicle brake system when the acceleration demand is less than the second threshold, the distance error is less than a second predetermined distance error ($<0$), and the speed error is less than a second predetermined speed error ($<0$).

Thus, a cruise control system of the type disclosed in our EP-A-0 612 641 can determine the running speed of a controlled vehicle by reference to the relative speed and relative distance of a target vehicle which is running ahead of the controlled vehicle on the road. If the target vehicle increases its speed, then the controlled vehicle will increase its speed correspondingly, up to the preset target speed initially set by the driver. Likewise, if the target vehicle slows down, then the controlled vehicle will be caused to slow down as well, either by reduction in throttle or by a reduction in throttle and by application of the vehicle brakes. If the target vehicle comes to a halt then the controlled vehicle will also be brought to a halt, a predetermined distance behind the target vehicle.

The apparatus of EP-A-0 612 641 also includes a limiting means for limiting the acceleration demand or error to less than a first positive demand threshold and greater than a negative demand threshold. In that apparatus, the acceleration/deceleration demands are limited by the limiting means to +15% g and −30% g, respectively. These maximum values of acceleration and deceleration have been found in practice to be the most suitable limits to ensure the comfort of the passengers in the vehicle. Any greater deceleration, for example, could cause the passengers to believe that the vehicle was undergoing emergency braking and cause corresponding concern and lack of relaxation.

A problem in operation of such a system is that the situation may arise where the target vehicle running in front of the vehicle under cruise control decelerates in such a manner that the controlled vehicle at maximum permitted braking by the cruise control system, eg 0.3 g, cannot maintain an acceptable spacing, even to the extent that a collision could occur.

In accordance with the present invention, the cruise control system is adapted to inform the driver when the maximum braking force allowed by the cruise control system is being applied so that the driver can make a decision as to whether or not to take control of the vehicle.

This is not a collision warning/avoidance system which would, for example, compute the measured relative velocities, calculate "time to impact" and advise the driver according to initiate emergency action; but rather provides simply an indication to the driver that the maximum braking force is currently being employed.

The indication to the driver can be audible, visual or by touch (HAPTIC), or any combination of these.

Preferably, the system provides an audible warning, such as an intermittent bleep.

In an advantageous embodiment the warning can be initiated at a situation where the maximum permitted deceleration has not yet been reached, the warning increasing in frequency and/or severity as the maximum deceleration condition is approached.

Figure 2:
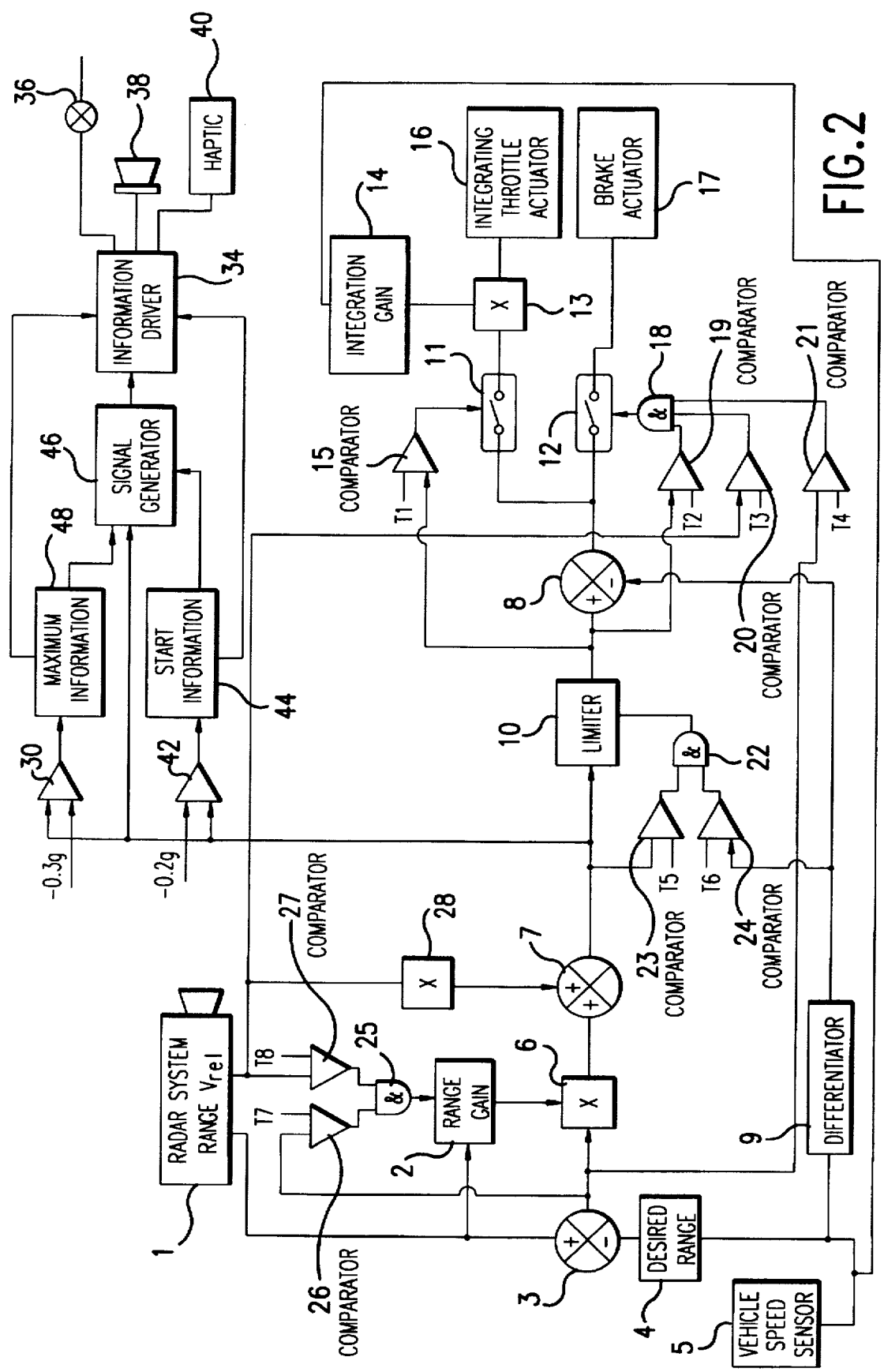

The invention is described further hereinafter, by way of example only, with reference to the accompanying drawings, in which:

FIG. 1 is a block circuit diagram of one embodiment of a cruise control apparatus in accordance with the present invention; and FIG. 2 is a block circuit diagram of a second embodiment of a cruise control apparatus in accordance with the present invention.

The apparatus of FIGS. 1 and 2 is basically identical in principle to that of our earlier EP-A-0 612 641 and reference to that prior document is hereby directed for a full explanation of the illustrated system. Only those parts of the full description from EP-A-0 612 641 are included herein as are necessary for a basic understanding of the operation of the illustrated system.

The cruise control apparatus shown in FIGS. 1 and 2 is provided in a vehicle driven by an internal combustion engine and comprises a radar system 1 which is mounted at the front of the vehicle and faces forwards so as to detect a further vehicle ahead of the vehicle. The radar system 1 provides a range output corresponding to the distance between the vehicle and the further vehicle and a relative speed output Vrel which corresponds to the difference in speeds of the vehicle and the further vehicle.

The range output of the radar system 1 is supplied to the adding input of a subtracter 3. The subtracting input of the subtracter 3 is connected to the output of a desired range setting circuit 4 whose input is connected to a vehicle speed sensor 5 for determining the speed of the vehicle. The sensor 5 may comprise any suitable sensor, such as an optical speed over ground sensor or a system for determining vehicle speed based on measurement of wheel speeds.

The output of the subtracter 3 is supplied to a first input of a multiplier 6 whose second input is connected to the output of a range gain setting circuit 2 having an input connected to the range output of the radar system 1. The output of the multiplier 6 is connected to a first input of an adder 7 whose second input is connected to the radar system 1 via a multiplier 28 so as to receive the relative speed signal. The multiplier is arranged to scale the relative speed signal prior to use by the adder 7. The multiplier 28 may be omitted if a gain of unity is applied to the relative speed signal. The output of the adder 7 is connected to the input of a limiter 10 for limiting the maximum positive and negative values of the acceleration demand signal. For instance, the maximum positive acceleration may be limited so as to be less than or equal to 15% g and the maximum deceleration may be limited so as to be less than or equal to 30% g, where g is acceleration due to gravity. The limited acceleration demand signal from the limiter 10 is supplied to the adding input of a subtracter 8 whose subtracting input is connected to the output of a differentiator 9. The input of the differentiator 9 is connected to the vehicle speed sensor so that the differentiator 9 provides a signal corresponding to the vehicle acceleration.

The output of the subtracter 8, which represents an acceleration error signal, is supplied to a gating arrangement comprising electronic switches 11 and 12. The switch 11 selectively connects the output of the subtracter 8 to a first input of a multiplier 13 whose second input is connected to the output of an integration gain setting circuit 14. The input of the circuit 14 is connected to the output of the vehicle speed sensor 5. The switch 11 is controlled by a comparator 15 having a first input connected to the output of the limiter 10 and a second input connected to receive a first threshold T1 which corresponds to an acceleration error which is normally greater than zero. The output of the multiplier 13 is connected to the input of a throttle actuator 16 of the internal combustion engine of the vehicle. The throttle actuator is of the type which controls the engine throttle in accordance with the integral with respect to time of the signal supplied thereto.

The switch 12 selectively connects the output of the subtracter 8 to a brake actuator 17 of the vehicle. The switch 12 has a control input connected to the output of an AND gate 18 having three inputs. The first input is connected to the output of a comparator 19 having a first input connected to the output of the limiter 10 and a second input connected to receive a threshold T2 corresponding to an acceleration which is less than zero. The second input of the gate 18 is connected to a comparator 20 having a first input connected to the radar system 1 so as to receive the relative speed signal and a second input connected to receive a threshold T3 corresponding to a relative speed or speed error which is less than zero. The third input of the gate 18 is connected to the output of a comparator 21 which has a first input connected to the output of the subtracter 3 so as to receive a range error signal and a second input connected to receive a threshold T4 corresponding to a range or distance error which is less than zero.

The limiter 10 has a disabling input for preventing the limiter from limiting the acceleration demand signal to the predetermined maximum limit value. The disabling input is connected to the output of an AND gate 22 which has two inputs. The first input of the gate 22 is connected to the output of a comparator 23 having a first input connected to the output of the adder 7 and a second input for receiving a threshold T5 corresponding to an acceleration demand which is equal to the maximum or upper limit value of the limiter. The second input of the gate 22 is connected to the output of a comparator 24 having a first input connected to the output of the differentiator 9 and a second input for receiving a threshold T6 corresponding to an acceleration between zero and the upper limit value.

The range gain setting circuit 2 has an input connected to the output of an AND gate 25 having two inputs. The first input of the gate 25 is connected to the output of a comparator 26 having a first input connected to the output of the subtracter 3 and a second input for receiving a threshold T7 corresponding to a predetermined distance error which is greater than zero. The second input of the gate 25 is connected to the output of a comparator 27 having a first input connected to receive the relative velocity signal from the radar system 1 and a second input for receiving a threshold T8 which corresponds to a predetermined speed error which is greater than zero.

When cruise control is selected, the cruise control apparatus shown in FIG. 1 controls the engine throttle and vehicle brake system automatically unless and until cruise control is disabled, for instance by the driver switching off cruise control or operating the accelerator or brake controls of the vehicle. The radar system 1 supplies range and relative speed signals corresponding to the distance between the vehicle and the closest other vehicle ahead of it and the difference between the speeds of the two vehicles. The range is supplied to the subtracter 3. The subtracter 3 forms a range error signal by subtracting the actual range from a desired range generated by the circuit 4. The circuit 4 sets the desired range as a function of the vehicle speed measured by the sensor 5. The circuit 4 may comprise a look-up table stored in a read only memory or a calculating circuit for calculating values of the function based on the vehicle speed. For instance, the desired range S may be determined in accordance with $$S=(0.23 \times v)+7$$

where the desired range S is given in meters and V is the vehicle speed in kph.

In the absence of the constant 7 meters, the vehicle would be arranged to follow the further vehicle with a time separation of 0.83 seconds. However, for increased flexibility, the desired range setting circuit 4 may be controllable by the driver so as to select any time separation, and hence desired range, within predetermined limits, for instance of 0.8 and 2.5 seconds. The constant 7 meters ensures that, for relatively low speeds, the vehicle maintains a minimum spacing from the further vehicle ahead of it so that, for instance, if the further vehicle were to stop, the vehicle in cruise control would stop with a desired range sufficient to prevent a collision.

The range or distance error from the subtracter 3 is multiplied in the multiplier 6 by a range gain which is set in the circuit 2. The circuit 2 may comprise a look-up table stored in read only memory or means for calculating the range gain primarily as a function of the actual range or distance between the two vehicles. The range gain may, for example, have a maximum value of 7 for target ranges below 6 meters and a minimum value of 1 for target ranges above 20 meters. Between 6 and 20 meters, the range gain decreases monotonically and continuously or substantially continuously.

The output of the multiplier 6 is added to the speed error signal by the adder 7, that is, in this embodiment, the multiplier 28 has a gain of one. Thus for target ranges of 20 meters and above, the relatively low range gain of 1 is applied to the distance error and the speed error therefore has more influence on cruise control. Even with the relatively low range gain, if the distance error persists for a substantial time, the integral action of the throttle actuator 16 corrects the distance error smoothly.

For relatively small desired ranges, a quicker response to distance error is required and the gain is progressively increased for desired ranges below 20 meters until it reaches the maximum value of 7 at 6 meters and below. For such small desired ranges, any distance error represents a relatively large proportion of the desired range and a quick response is required in order to remove the distance error and, for instance, prevent the vehicle from approaching too closely the further vehicle ahead of it.

Thus, for relatively small desired ranges, the distance error has substantially more influence than the speed error in controlling the vehicle.

When the output of the gate 25 is active, a signal is supplied to the second input of the circuit 2 which causes the circuit to halve the range gain set in accordance with the function. The comparator 26 detects when the distance error is relatively great so that the vehicle under cruise control is relatively far behind the vehicle ahead of it. The comparator 27 determines when the speed error is such that the vehicle under cruise control is closing on the vehicle ahead of it. Thus, when the controlled vehicle is closing but is relatively far behind the lead vehicle, the range gain is halved so as to prevent overshoot.

The gating arrangement comprising the switches 11 and 12, the comparator 15 and the comparator 19 via the gate 18 ensure that positive acceleration demands control the engine throttle whereas negative acceleration demands control the vehicle brake. The thresholds T1 and T2 may be made substantially equal to zero or may be made positive and negative, respectively, by predetermined amounts so as to provide a "dead band" between throttle control and brake control.

The output of the adder 7 represents an acceleration demand signal which itself could be used to control acceleration of a vehicle by being suitably processed and applied, for instance to the throttle actuator 16 and the brake actuator 17. However, in order to provide closed loop control of acceleration, the acceleration demand is compared with the actual vehicle acceleration in the subtracter 8 to form an acceleration error. The acceleration demand from the adder 7 is limited by the limiter 10 to a maximum value of +15% g and a minimum value of −30% g. These maximum values of acceleration and deceleration have been found to be advantageous for the comfort of passengers in the vehicle.

In the embodiment of present FIG. 1, the output of the adder 7 is also connected to one input of a further comparator 30 whose second input carries a fixed signal representative of an acceleration of −0.3 g. Thus, if the deceleration demand formed by the adder 7 is more than −0.3 g, ie. the maximum deceleration permitted by the limiter 10 to be obtainable under the control of the cruise control system, then the comparator 30 provides an output on a line 32 which is directed to an information driver element 34. The latter element 34 is shown coupled to a flashing lamp 36, a sound generator 38 and a HAPTIC controller 40. In a practical embodiment, there might by any one or more of the elements 36,38,40 present. A preferred system would at least include the sound generator 38. This will give the driver an audible warning or notification that the deceleration demand is currently exceeding the maximum deceleration permitted for the vehicle while it is under cruise control. This then gives that driver the opportunity to take action he/she may see fit which may or may not include disengagement of the cruise control.

The arrangement of FIG. 2 is essentially the same as that of FIG. 1, the only difference being that the information provided to the driver changes as the maximum permitted deceleration is approached. For this purpose, the system includes further comparator 42 connected by one input to the adder 7, the second input being connected to a signal representative of a deceleration of, say, 0.2 g. Triggering of the comparator 42 energises a "start information" element 44 which controls a signal generator 46 to produce a drive signal of first or increasing frequency for the information driver 34. Triggering of the comparator 30, responsive to the maximum deceleration condition, then energises a "maximum information" element 48 which produces the maximum level (frequency and/or loudness) of the information signal from the lamp 36, audible warning 38 or HAPTIC 40.

It should be noted that the figure quoted herein as the maximum deceleration level (0.3 g) is merely a typical level found in some cases to be satisfactory. However, the invention is not limited to this level since it can vary widely in practice to suit the practical conditions and vehicle performance.

I claim:

1. A cruise control system for a road vehicle comprising:
   a brake actuator applying a braking force to implement road vehicle deceleration;
   a control portion determining and supplying a braking control signal to the brake actuator, said braking control signal having a level determining the level of the braking force applied by the brake actuator and corresponding road vehicle deceleration; and
   a braking control signal level monitoring and warning portion, said braking control signal level monitoring and warning portion comprising,
   a first comparator having a first input connected to a first reference source to receive a first predetermined reference level and a second input connected to the control portion to receive the braking control signal, said first comparator providing a first trigger signal when the level of the braking control signal exceeds the first predetermined reference level,
   a start warning portion connected to the first comparator to receive the first trigger signal, said start warning portion responding to any received first trigger signals to supply a first warning control signal to a warning generator portion to control said warning generator portion to provide a first distinctive warning output to an operator of the road vehicle, said first distinctive warning output indicating that a maximum permitted road vehicle deceleration is imminent, a second comparator having a first input connected to a second reference source to receive a second predetermined reference level and a second input connected to the control portion to receive the braking control signal, said second comparator providing a second trigger signal when the level of the braking control signal exceeds the second predetermined reference level, and a maximum level warning portion connected to the second comparator to receive the second trigger signal, said maximum level warning portion responding to any received second trigger signals to supply a second warning control signal to the warning generator portion to discontinue the first distinctive warning output and to substitute a second distinctive warning output to the operator of the road vehicle, said second distinctive warning output indicating that the maximum permitted road vehicle deceleration has been reached.

2. A cruise control system according to claim 1, wherein the first and second distinctive warning outputs are provided by a transducer as an audible, visual, or tactile output.

* * * * *